United States Patent

[11] 3,625,580

| [72] | Inventors | Arnold O. DeHart<br>Rochester, Mich.;<br>Duane H. Harwick, Kettering, Ohio |
|---|---|---|
| [21] | Appl. No. | 12,716 |
| [22] | Filed | Feb. 19, 1970 |
| [45] | Patented | Dec. 7, 1971 |
| [73] | Assignee | General Motors Corporation<br>Detroit, Mich. |

[54] JOURNAL BEARING FOR FLUCTUATING LOADS
4 Claims, 8 Drawing Figs.

[52] U.S. Cl. ................................................ 308/240, 74/580
[51] Int. Cl. ................................................ F16c 3/14
[50] Field of Search ........................................ 308/240, 237; 74/579, 580

[56] References Cited
UNITED STATES PATENTS

| 2,916,333 | 12/1959 | Johnson | 308/240 |
| 3,172,304 | 3/1965 | Robertson | 308/240 |
| 3,201,183 | 8/1965 | Buske | 308/240 |
| 3,168,358 | 2/1965 | Buske | 308/240 |

Primary Examiner—Martin P. Schwadron
Assistant Examiner—Barry Grossman
Attorneys—J. L. Carpenter and Robert J. Outland ABSTRACT: A journal bearing adapted for use in main and connecting rod journals of internal combustion engines and like applications, wherein high-fluctuating loads result in deformation of the bearing containing member, with consequent close-in adjacent the split line between the two bearing shells. The bearing comprises a pair of bearing shells, preferably including a central concentric section having an inner surface centered on the bearing axis and connecting with eccentric end sections providing for progressively increasing clearance from the associated journal adjacent the bearing split line. The eccentric end sections extend sufficiently far from the split line to prevent bearing distress due to close-in. High-load capacity and low-oil flow requirements are attained by the use of a relatively large concentric central section.

PATENTED DEC 7 1971

INVENTORS
Arnold O. DeHart &
BY Duane H. Harwick

Robert J. Outland
ATTORNEY

INVENTORS
Arnold O. DeHart &
BY Duane H. Harwick

Robert J. Outland
ATTORNEY

JOURNAL BEARING FOR FLUCTUATING LOADS

1. Field of the Invention

This invention relates to journal bearings which are particularly adapted for fluctuating load applications in locations such as the main and connecting rod bearings of internal combustion engines and like applications.

It is known in the art relating to journal bearings as applied to internal combustion engines and like mechanisms to mount the crankshaft in the block and to secure the connecting rods to the crankpin journals using cylindrical journal bearings having an essentially circular cross section slightly larger than their associated journals. Such bearings may be referred to as concentric bearings since, under no load conditions if the journal is centered within the bearing, there is a constant clearance between the journal and bearing surface at all points.

In many cases, such concentric bearings are not satisfactory for use as main and connecting rod bearings in modern engines under the high-load and speed conditions encountered therein. The bearings in these locations usually comprise a pair of semicircular inserts or bearing shells which are retained in a bore of the connecting rod or block, wherein half of the bore is formed by a removable cap provided to permit assembly of the journal and the bearing shells within the bore. The higher speeds and loads of modern automotive engines have been found to introduce sufficient stresses into the bearing receiving members of the connecting rod and block that the bores retaining the bearing inserts are periodically slightly deformed by the fluctuating loads imposed. This deformation causes a slight reduction in diameter of the bore perpendicular to the direction of loading which, in the case of connecting rods and main bearings, is usually at the split line between the cap and its associated member. This is, in most cases, also the split line between the bearing inserts. Such deformation, commonly called "close-in," reduces the bearing clearance at the split line and may result in excessive wear or failure of the insert if additional clearance is not provided to accommodate the varying dimensions.

The solution to the close-in problem has, in the past, been the use of so-called "eccentric" bearings, in which the arcuate surfaces of the two bearing shells are located on different axes spaced from one another so that the diameter of the bearing at the split line is larger than that at the centers of the two bearing shells. This results in a progressively increasing clearance, when the journal is centered in the bearing, from the central or load carrying portion of the bearing to the ends of the bearing shells at the split line. In many cases, also, an additional slight relief has been required at the split line of the bearing shells in order to provide additional clearance to accommodate a slight misalignment of the bearing shells in assembly, without permitting the sharp edge of one of the bearing shells to engage the associated journal so as to scrape off the oil film and cause a bearing failure.

While the eccentric bearing has provided an answer to the close-in problem, it has the disadvantage over concentric bearings of a reduction in load capacity, the amount of which depends upon the degree of eccentricity. At the same time, the increased clearance extending from the split line to nearly the center of the bearing causes an added leakage of oil from the bearing, which requires increased oil flow to maintain an adequate oil supply for lubrication.

SUMMARY OF THE INVENTION

The present invention provides an improved journal bearing configuration which combines the best features of concentric and eccentric bearings in a manner to provide load carrying capacities approaching that of the concentric bearing, while accommodating close-in and minor misalignment of the bearing shells to a degree equivalent to an eccentric bearing of comparable size and substantially lower load carrying capacity. At the same time, the loss of oil from the bearing is substantially less than comparable eccentric bearings.

These advantages are obtained by constructing the bearing shells with a concentric central portion, which preferably extends for an arc of from about 90° to a maximum of 135°, but may, in some instances, cover an arc as small as 60° or as large as 140°. At either end of the concentric central portion, there is provided an eccentric end portion which provides progressively increased clearance from its connection with the central portion to the end of the bearing shell at the split line of the bearing. The eccentric portions of each shell are preferably formed as arcs from a common axis which is spaced from the axis of the bearing.

In automotive bearings in a size range of from approximately 2 to 3 inches in diameter it has been found that an increase in clearance of about 0.002 inches at the split line on each side is adequate for present engine requirements, with the additional requirement that the length of the eccentric end portions be no less than, and preferably greater than, one-half inch, in all cases.

While it would be possible to add an additional split line relief to concentric-eccentric bearings formed according to this invention, we have not found this to be necessary in automotive bearings made in accordance with the foregoing dimensional requirements.

Further understanding of the invention and its advantages may be obtained from the following description of the preferred embodiment, taken together with the accompanying drawings.

DESCRIPTION OF THE PREFERRED EMBODIMENT

Figure 1:
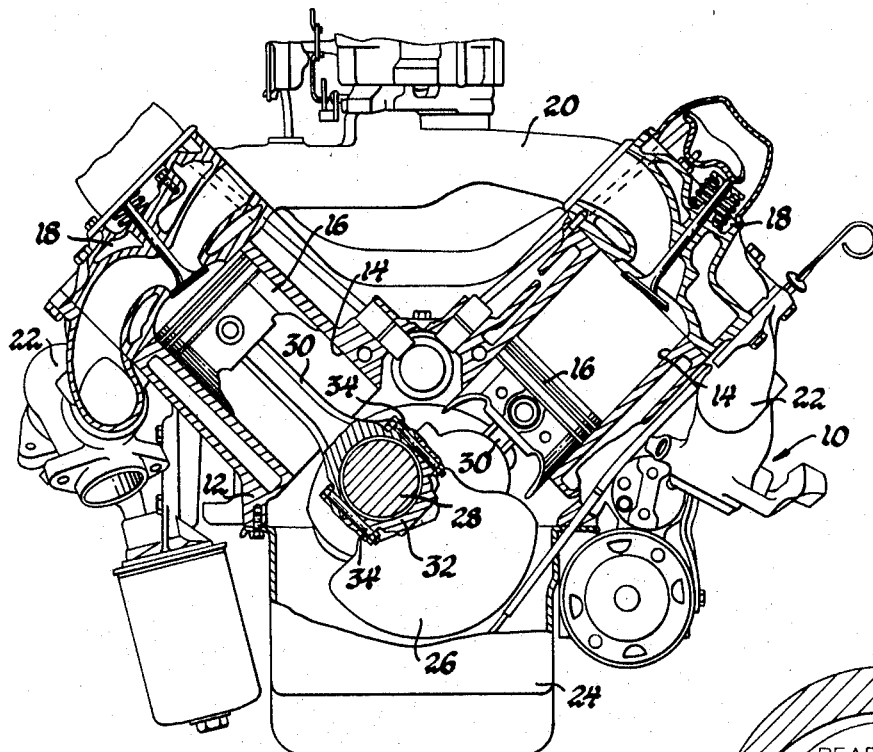
FIG. 1 is a cross-sectional view of an internal combustion engine, including bearing means according to the invention.

Referring first to FIG. 1 of the drawings, numeral 10 generally indicates an internal combustion engine of a type commonly used in automotive vehicles. Engine 10 includes a cylinder block 12 having two banks of cylinders 14 containing reciprocable pistons 16 and conventionally closed by cylinder heads 18 to which are connected the usual intake and exhaust manifolds 20, 22, respectively.

The lower portion of the cylinder block forms a crankcase which is enclosed conventionally by an oil pan 24. Within the crankcase, a crankshaft 26 is rotatably carried by the cylinder block 12 in main bearings, not shown, but which may be formed in accordance with the principles of the present invention. Crankshaft 26 includes a plurality of offcenter crankpin journals 28 to which the pistons 14 are connected by means of connecting rods 30, which include detachable caps 32 secured to the main bodies of their respective connecting rods by suitable bolt means 34.

Figure 2:
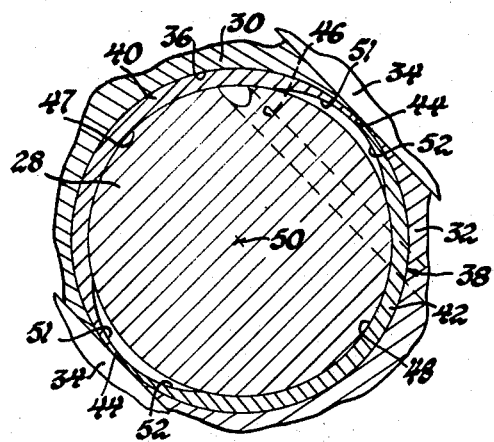
FIG. 2 is an enlarged view of a portion of the engine of FIG. 1, showing the connecting rod-crankpin journal bearing assembly.

As best shown in FIG. 2, each connecting rod 30 and its attached cap 32 together define a cylindrical bore 36, within which the crankpin journal is received. Fixedly secured within each bore 36 and in rotatable bearing contact with its crankpin journal 28 is a journal bearing generally indicated by numeral 38 and formed in accordance with the principles of the present invention. Bearing 38 is made up of upper and lower semicircular bearing inserts or shells 40 and 42, respectively, which are maintained in endwise abutment at split lines 44. Oil passage means 46 are provided in the crankshaft and extend to the inner surface of the bearing in the crankpin 28 to supply lubricating oil to the inner surface of the bearing so as to normally maintain the crankpin journal 28 out of contact with the bearing inner surface during engine operation.

Figure 3:
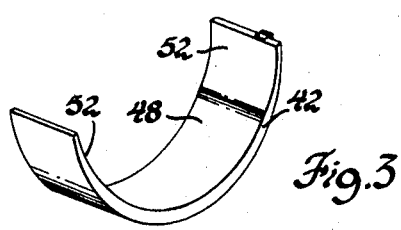
FIG. 3 is a pictorial view of one of the bearing shells from the bearing of FIGS. 1 and 2.

In the disclosed embodiment, the interior surfaces of the two bearing shells 40, 42 are identical and unbroken by oil grooving or patterns, as is best shown in FIG. 3, which shows the lower bearing shell 42. It is, however, within the scope of the invention to form the interior surfaces of the upper and lower shells of slightly differing configurations and to provide suitable oil grooving, distribution patterns, oil holes and the like, as desired, to accommodate a particular bearing application.

In accordance with the invention, the bearing shells 40, 42 in the disclosed embodiment have their interior surfaces divided into concentric central portions 47, 48, respectively centered on the central axis 50 of the bearing, and pairs of eccentric end portions 51, 52 respectively, extending from the ends of the central portions and having progressively increasing distances from the central axis as they approach the ends of the bearing shells at the split lines 44.

Figure 4:
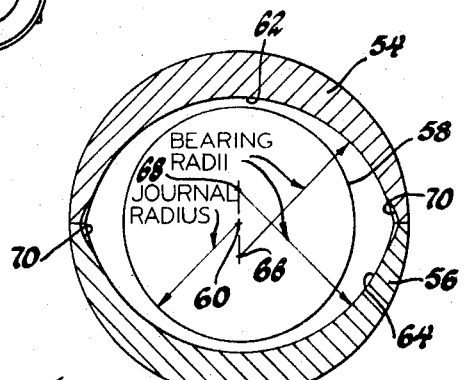
FIGS. 4 and 5 are diagrammatic illustrations showing, respectively, a prior art eccentric bearing and a concentric-eccentric bearing according to the present invention.
Figure 5:
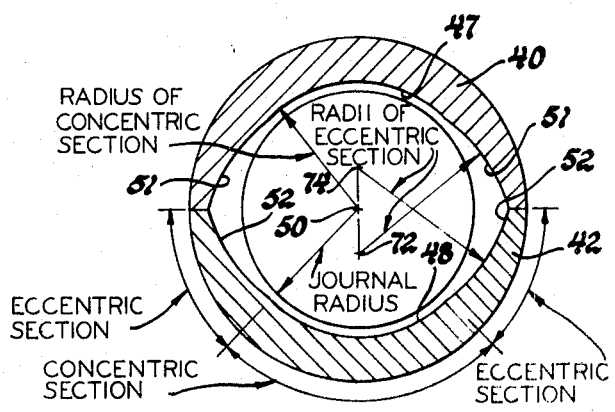

FIGS. 4 and 5 diagrammatically compare the features of the prior art eccentric bearing shown in FIG. 4 with those of the bearing of the present invention shown in FIG. 5. As shown in FIG. 4, the prior art eccentric bearing comprises a pair of semicircular bearing shells 54, 56 which surround a journal 58 that, for descriptive purposes, is shown as centered on the axis 60 of the bearing. The inner surfaces 62, 64 of the bearing are arcuate in cross section but are centered on axes 66, 68, respectively, which are eccentric from the central axis 60 of the bearing, so that the clearance between the journal and bearing shells becomes greater from the center of each shell to its outer ends. Additional short relieved portions 70 are provided in the bearing shells adjacent the split lines to provide for minor misalignment during assembly, as previously noted. The difference between the diameter at the split lines, excluding the split line relief portions, and the diameter across the centers of the two bearing shells, is referred to as the bearing eccentricity. In common automotive practice, the eccentricity usually ranges from about 0.001 to 0.003 inches. Thus, the maximum difference in clearance around the journal excluding local split line relief, is 0.0015 inches assuming a centered journal.

In the concentric-eccentric bearing of the present invention, as shown in FIG. 5, the inner surfaces of the upper and lower bearing shells 40,42 are, as previously noted, made up of concentric central portions 47 and 48, bounded by pairs of eccentric end portions 51, 52. When the journal 28 is centered on the axis 50 of the bearing, the central portions are concentric with the journal; that is, there is a constant clearance between the journal and the central portions. The eccentric end portions are, however, formed from arcs centered on axes 72, 74, respectively, which are eccentric to the bearings axis 50, so that the end portions provide increasingly large clearances with the journal from their intersection with the central portions to the ends of the bearings at the split line between the two shells. This provides a composite bearing surface, in which the central sections act in the manner of a concentric bearing to support the load, while the eccentric end portions provide clearance to accommodate close-in of the bearing during high loads, as well as a minor amount of misalignment during assembly.

Figure 6:
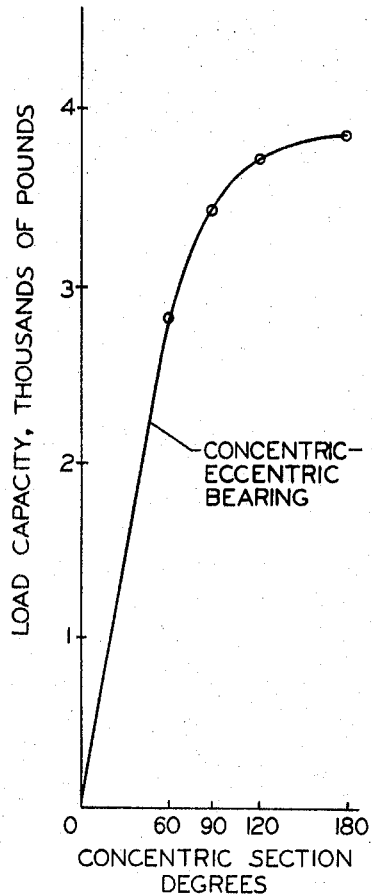
FIGS. 6, 7 and 8 graphically present calculated and test information relating to the load capacity and oil flow requirements of concentric-eccentric bearings and the prior art eccentric bearings.

FIG. 6 graphically presents the calculated load capacity under predetermined conditions of concentric-eccentric bearings wherein the concentric central portion covers angles of from 0° to 180°. The calculations are on the basis that all the load is supported by the concentric central portions and that the eccentric end sections would carry no load. It is obvious, of course, that the figure at 180° represents a true concentric bearing. Note, then, that the load capacity, when the concentric section is reduced to 120°, is only slightly lower than at 180°. At 90°a somewhat greater reduction of load capacity is the result. If the concentric portion is reduced to 60°, the load reduction is significant, but the bearing will still carry more than two-thirds the load of a completely concentric bearing. From this graph it is apparent that, from the standpoint of load capacity alone, it is desirable to choose the greatest possible angle for the concentric section which is acceptable for the other bearing requirements.

Figure 7:
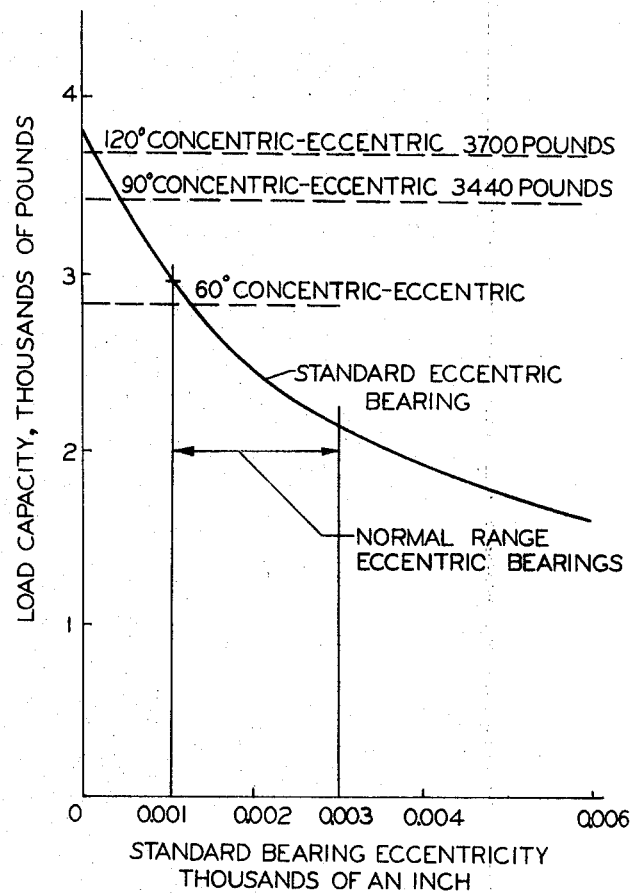

FIG. 7 shows the calculated reduction in load capacity of a standard eccentric bearing under conditions the same as for FIG. 6 as the eccentricity is increased from 0 up to 0.006 inches. For comparison purposes, the load capacities of concentric-eccentric bearings having concentric sections of 60°, 90° and 120° are also indicated. Since current engine designs use eccentric bearings ranging from 0.001 to 0.003 inches eccentricity, it is apparent that all the comparable concentric-eccentric bearing designs have a higher load capacity, with the exception of the 60° concentric-eccentric bearing, as compared to an eccentric bearing of the smallest eccentricity, 0.001 inches. It should be understood that the information given in both FIGS. 6 and 7 is calculated according to commonly accepted formulae.

Figure 8:
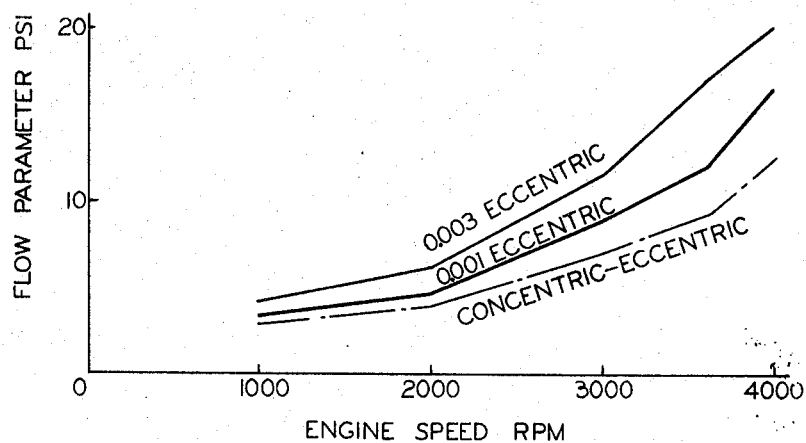

In FIG. 8, the results of engine tests are given which compare the oil flow requirements of our novel bearing with comparable eccentric bearings of 0.001 and 0.003 inches eccentricity. The oil flow parameter indicated as the ordinate of the graph actually represents the pressure drop through an oil feed passage of fixed resistance, which was used to feed oil to one standard main bearing plus two connecting rod bearings in which the various test pieces were interchangeably placed. The change in pressure drop with the various bearings, which is proportional to flow through the feedline, was due solely to the use of the different connecting rod bearings, since the other variables were maintained substantially constant during the tests. These results indicate a substantially reduced oil flow, or loss, and the consequent maintenance of higher oil pressure when using concentric-eccentric bearings as opposed to standard eccentric bearings.

In the development of concentric-eccentric bearings according to the invention in the size range or from 2 to 3 inches inner diameter, it has been found that to obtain completely satisfactory results, the eccentric end portions of each bearing shell should extend for at least one-half inch from the bearing split line. Also, it is preferable that the increase in clearance over the length of the eccentric portion be approximately 0.002 inches for a total diametral difference of 0.004 inches at the split line, as compared to the concentric portions of the bearing. If the eccentric end portions are made too short, it has been found that excessive wear results at the junction of the concentric and eccentric portions and the conditions, of course, approaches that of a pure concentric bearing. Thus, as concentric-eccentric bearings are made in the smaller size, it is necessary to limit the maximum angular dimension of the concentric portion in order to obtain the required minimum length of the eccentric portions. In general, however, the angular extent of the eccentric portions should be maintained as small as possible consistent with satisfactory operation of the bearing from the standpoints of wear and distress at and adjacent to the split line. In this way, maximum load-carrying capacity will be achieved with a minimum of oil flow required to maintain an adequate oil film thickness for operation of the bearing.

While the invention has been described by reference to a preferred embodiment, it should be understood that numerous changes could be made within the scope of the inventive concepts disclosed. For example, although the preferred embodiment has the eccentric end portions of the bearing formed as arcs centered on a single axis, it is not absolutely necessary that these surfaces be formed in this manner but they could, instead, be arcs of different circles or be of other than arcuate shapes as long as the requirement of progressively increasing clearance as the split line is approached is maintained.

We claim:

1. A journal bearing for internal combustion engines and the like wherein a rotatable journal subject to significantly fluctuating loads is received within a cylindrical opening defined jointly by a pair of detachably secured members, said bearing comprising a pair of semicylindrical bearing shells adapted to be opposedly received within such opening to define a generally cylindrical inwardly facing bearing surface having a central axis, said bearing surface being adapted to surround such journal in close fitting bearing relationship with clearance for formation therebetween of a load carrying lubricating oil film, at least one of said bearing shells having its said bearing surface, exclusive of lubricant openings, grooves and the like, divided circumferentially into a concentric central portion and a pair of eccentric end portions, said portions each extending axially the full width of their respective bearing shell, said concentric central portion being equidistant at all points from said central axis and extending circumferentially for an angular dimension of not more than about 140° and not less than about 60°, said eccentric end portions extending outwardly from the opposite ends of said central portion and of progressively increasing distance from said central axis toward the ends of said shell, and said eccentric end portions each being not less than one-half inch in length, whereby sufficient additional journal clearance is provided adjacent the abutting ends of the two bearing shells to accommodate close-in during operation while maintaining a high load carrying capacity with a minimum flow of lubricating oil.

2. A journal bearing for internal combustion engines and the like wherein a rotatable journal subject to significantly fluctuating loads is received within a cylindrical opening defined jointly by a pair of detachably secured members, said bearing comprising a pair of semicylindrical bearing shells adapted to be opposedly received within such opening to define a generally cylindrical inwardly facing bearing surface having a central axis, said bearing surface being adapted to surround such journal in close fitting bearing relationship with clearance for formation therebetween of a load carrying lubricating oil film, each said bearing shell having its said bearing surface exclusive of lubricant openings, grooves and the like, divided circumferentially into a concentric central portion and a pair of eccentric end portions, said portions each extending axially the full width of their respective bearing shell, said concentric central portion being equidistant at all points from said central axis and extending circumferentially for an angular dimension of not more than about 140° and not less than about 60°, said eccentric end portions extending outwardly from the opposite ends of their respective central portion and of progressively increasing distance from said central axis toward the ends of their respective bearing shell, and said eccentric end portions each being not less than one-half inch in length, whereby sufficient additional journal clearance is provided adjacent the abutting ends of the two bearing shells to accommodate close-in during operation while maintaining high load carrying capacity for the bearing with a minimum flow of lubricating oil.

3. The bearing of claim 2 wherein said eccentric end portions of the respective bearing shells are of substantially equal circumferential dimension and are arcs of respective common cylinders having their centers located on eccentric axes parallel to and spaced from said central axis substantially equal amounts on the sides opposite the respective bearing shells.

4. The bearing of claim 3 wherein the maximum distance from the central axis to the bearing surface is on the order of about 0.002 inches greater than the minimum distance.

* * * * *